(12) United States Patent
Jones et al.

(10) Patent No.: US 6,219,344 B1
(45) Date of Patent: Apr. 17, 2001

(54) PILOT AIDED TRAFFIC CHANNEL ESTIMATION FOR CDMA CELLULAR SYSTEMS

(75) Inventors: William W. Jones; Thomas J. Kenney, both of San Diego, CA (US)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/296,141

(22) Filed: Apr. 21, 1999

(51) Int. Cl.[7] .................................................. H04J 13/04
(52) U.S. Cl. ............................................. 370/335; 370/342
(58) Field of Search .................................... 370/328, 329, 370/332, 335, 342, 437, 441, 465, 479, 483, 491, 496, 497, 500, 514, 515, 517, 519, 533, 536, 385, 442, 324, 516; 375/200, 219–221, 130, 137, 140; 455/500, 501, 524–526, 102–105, 115, 116, 403, 422, 425, 450, 465

(56) References Cited

U.S. PATENT DOCUMENTS

| | | | |
|---|---|---|---|
| 5,737,327 | * 4/1998 | Ling et al. | 370/335 |
| 5,754,583 | * 5/1998 | Eberhardt et al. | 375/200 |
| 5,809,020 | * 9/1998 | Bruckert et al. | 370/335 |
| 5,812,542 | * 9/1998 | Bruckert et al. | 370/335 |
| 5,930,288 | * 7/1999 | Eberhardt | 375/200 |
| 6,064,338 | 5/2000 | Kobayakawa | |

FOREIGN PATENT DOCUMENTS

| | | |
|---|---|---|
| 0 984 576 | 3/2000 | (EP) . |
| 2 343 817 | 5/2000 | (GB) . |
| 11-274976 | 10/1999 | (JP) . |

OTHER PUBLICATIONS

H.N. Lee et al., "Fast Adaptive Equalization/Diversity Combining for Time–Varying Dispersive Channels", *IEEE Transactions on Communications*, vol. 46, No. 9, pp. 1146–1162, Sep. 1998.

Author and title unknown. Excerpt from 1997 IEEE 47th Vehicular Techology Conference, Phoenix, Arizona, pp. 887–888, May 4–7, 1197.

* cited by examiner

*Primary Examiner*—Dang Ton

(57) ABSTRACT

In a CDMA cellular system, a method for estimating the amplitude of a traffic channel based on a pilot signal received from two or more basestations. Each channel in a RAKE receiver is provided with a data signal received on a traffic channel and a pilot signal received on a pilot channel. A comparison is made between the product of the pilot signal and the data signal versus the product of the pilot signal and an estimate of the traffic channel amplitude. The estimate of the traffic channel amplitude drives a feedback loop to refine the comparison and the data signal is weighted by the traffic channel amplitude estimate and combined with weighted data signals in the other channels of the RAKE receiver.

6 Claims, 3 Drawing Sheets

CONTINUOUS PILOT

CONTINUOUS PILOT

EMBEDDED PILOT SYMBOLS

PILOT AIDED TRAFFIC CHANNEL ESTIMATION FOR CDMA CELLULAR SYSTEMS

FIELD OF THE INVENTION

The present invention relates to wireless telephone systems in general, and in particular to traffic channel estimation systems using pilot symbols.

BACKGROUND OF THE INVENTION

As the use of wireless telephone communications becomes more widespread, there is an ever increasing need to enhance the ability of transceivers to detect the wireless communication signals transmitted while minimizing the amount of bandwidth utilized.

One commonly used cellular telephony system is called code division multiple access (CDMA), wherein all cellular telephones in the system transmit their signals on a traffic channel having the same range of frequencies without regard to when other telephones are transmitting. To differentiate the transmissions to and from each cellular telephone, each telephone is associated with a unique pseudo-noise (PN) code that precedes transmissions to and from that particular telephone. To separate the signals that are designated for a particular telephone, a received signal is correlated with the telephone's unique PN code. Because each of the PN codes is generally orthogonal to all other codes in use, those signals not containing the desired PN code appear as background noise at a receiver.

In a real world cellular system, each cellular telephone receives multiple versions of a desired signal due to different paths traveled by the signals as they are transmitted between a basestation and the cellular telephone. This produces a condition known as multipath interference. To extract a desired signal from the signals that are directed to other telephones and from the multipath interference, most CDMA cellular telephones include a RAKE receiver having a number of signal paths. Each signal path correlates a differently delayed version of a received signal with the cellular telephone's unique PN code in order to extract the desired signal transmitted from a particular basestation. The outputs of each of the correlators are then further processed in a manner that attempts to undo the distortion created in the channel between a basestation and the cellular telephone.

To aid the RAKE receiver in determining the level of distortion that is introduced into the traffic channel, the CDMA basestations transmit a pilot signal having a known bit sequence on a pilot channel in addition to the data signals that are transmitted on the traffic channel. Based upon analysis of the pilot signal, the RAKE receivers can estimate the distortion of the traffic channel.

When the cellular transceiver is only receiving signals from a single basestation, the pilot signal can be used to estimate the characteristics of the traffic channel. However, in actual cellular systems, a cellular transceiver may receive signals from more than one basestation. With each basestation transmitting its own pilot signal, an estimate of the traffic channel cannot be made as readily because the characteristics of the pilot signal with respect to the traffic channel for each basestation are generally not the same. Therefore, there is a need for a technique that can accurately estimate the traffic channel characteristics when cellular signals are being received from two or more basestations in order to optimize the reception of signals in a RAKE receiver.

SUMMARY OF THE INVENTION

To improve the ability of a RAKE receiver to detect CDMA cellular signals received from two or more basestations, the present invention produces an estimate of a traffic channel amplitude for each channel of the RAKE receiver based on a comparison with a received pilot signal. The traffic channel estimate weights the incoming cellular signals prior to combination with other weighted cellular signals in other channels of the RAKE receiver.

The difference between the estimate of the traffic channel amplitude and the pilot signals drives a feedback loop to refine the estimate of the traffic channel amplitude.

DETAILED DESCRIPTION OF THE PREFERRED EMBODIMENT

The present invention is a system for estimating traffic channel characteristics when pilot symbols are received from more than one basestation in a CDMA cellular system.

Figure 1:
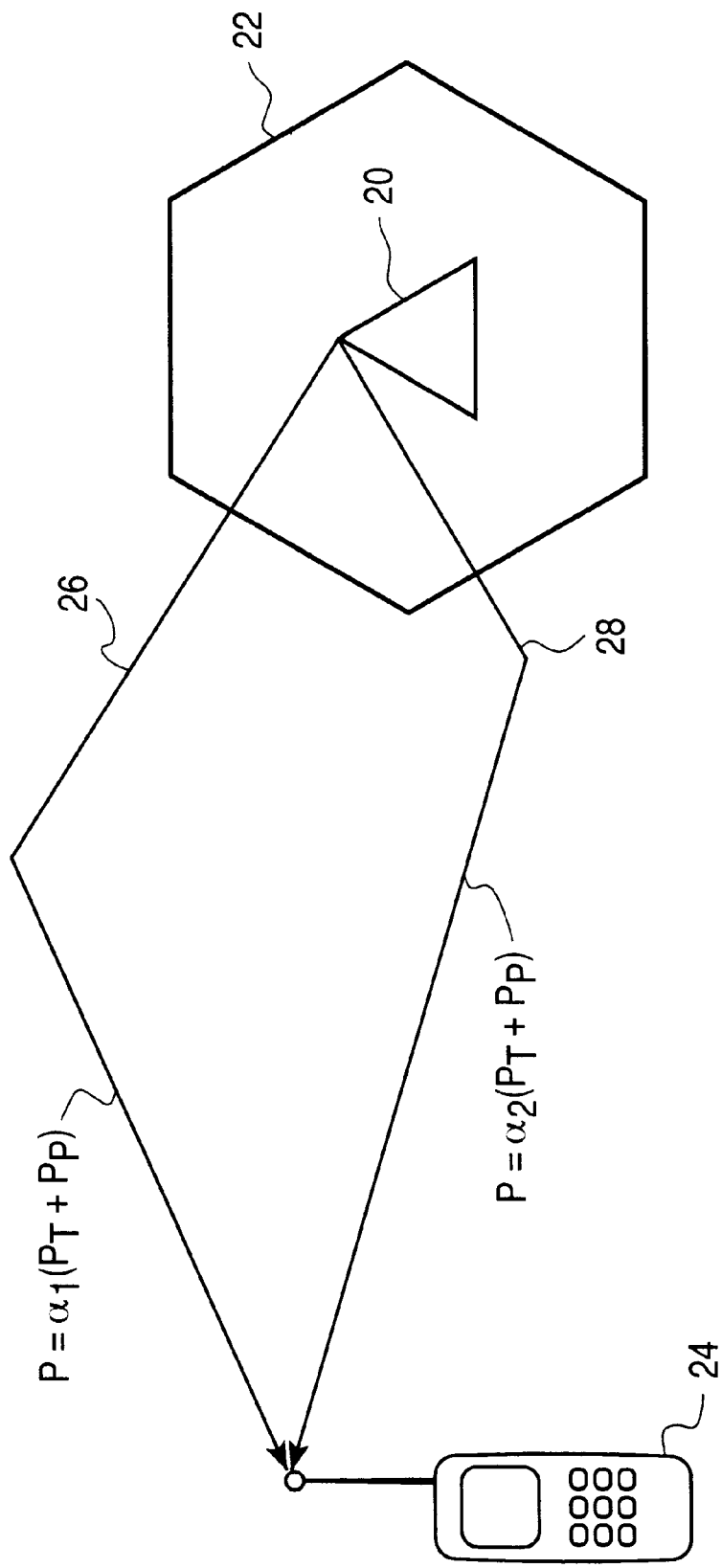
FIG. 1 illustrates a simplified diagram of a CDMA cellular system wherein a cellular telephone receives signals from a single basestation.

A simplified illustration of a CDMA cellular telephone system is shown in FIG. 1. In this system, a basestation 20, located within a first cell 22, transmits and receives signals to and from a cellular telephone 24. In a CDMA system, the transmissions to and from the particular cellular telephone 24 are preceded by a unique PN code which is substantially orthogonal to all other PN codes transmitted by the other cellular telephones in the system. Due to the geography and buildings between the basestation 20 and the cellular telephone 24, transmissions from the basestation 20 may arrive at the cellular telephone via a number of different signal paths. In the illustration shown, there are two different signal paths 26 and 28. The lengths of each signal path may be slightly different. Therefore, the same signal transmitted from the basestation 20 may arrive at the cellular telephone 24 at different times, causing multipath interference.

In the cellular telephone 24 is a RAKE receiver that contains a number of different channels or fingers. Each channel includes a correlator that correlates a received signal with the PN code designated for that particular cellular telephone. The outputs of each of the fingers are weighted and combined to produce the best possible signal. To determine the weights associated with each finger, an estimation must be made of the traffic channel distortion that occurs between the basestation 20 and the cellular telephone 24. By measuring the amplitude of the pilot signal transmitted on a pilot channel, an estimation of the traffic channel distortion can be made and the weights that scale the signals produced by each finger of the RAKE receiver can be adjusted to optimize the combined signal.

Figure 2:
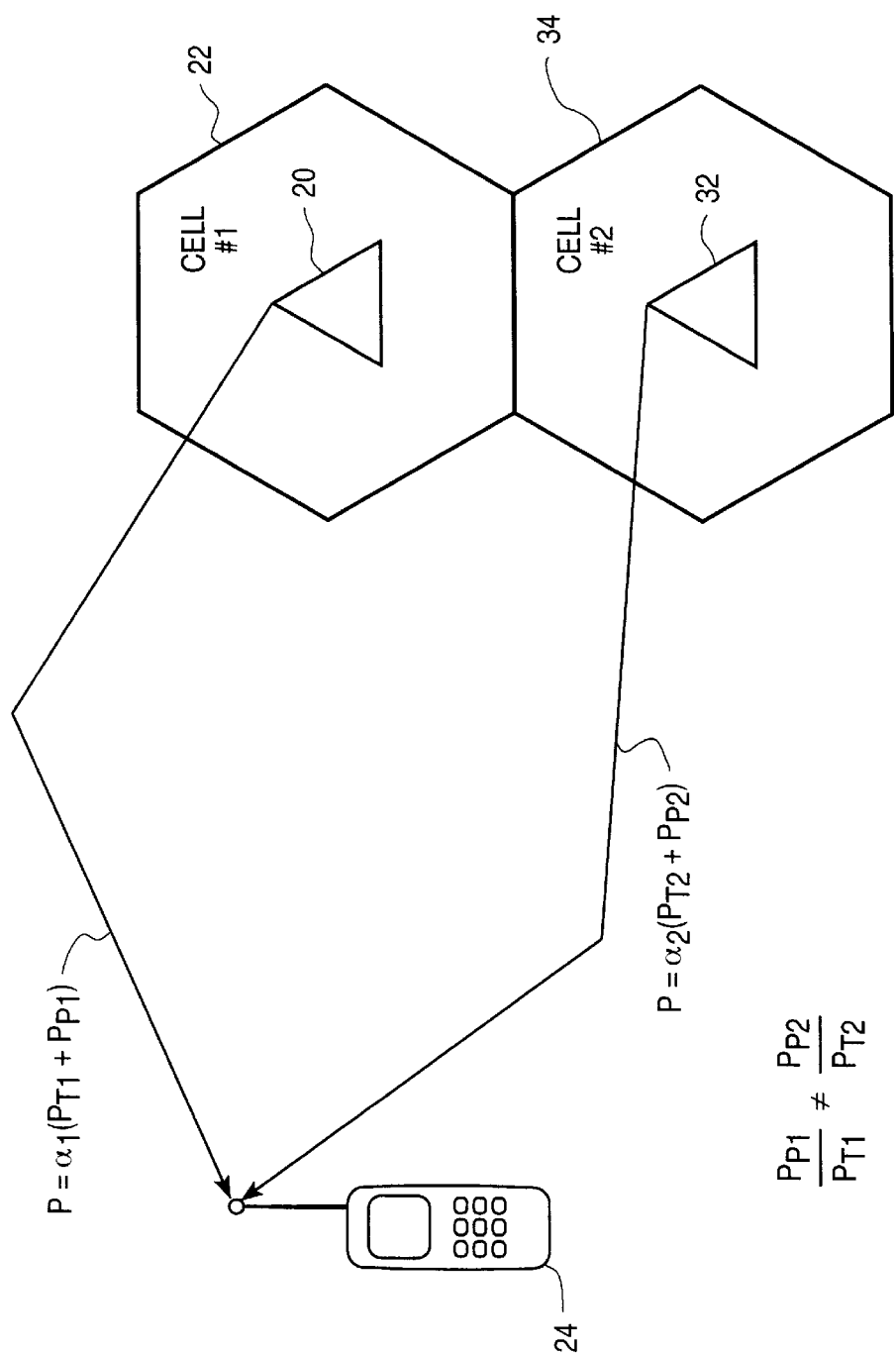
FIG. 2 illustrates a simplified CDMA cellular system in which a cellular telephone receives signals from two or more basestations.

In many instances, a cellular telephone will receive signals that are transmitted from more than one basestation. As shown in FIG. 2, the cellular telephone 24 receives signals from the basestation 20 located in the first cell 22 and from a second basestation 32 located in a second cell 34. The pilot signal transmitted from the basestation 32 may not correctly model the distortion in the traffic channel between the basestation 20 and the cellular telephone 24. Similarly, the pilot signal transmitted from the basestation 20 may not accurately model the distortion in the traffic channel between the basestation 32 and the cellular transceiver 24. Therefore, the RAKE receiver cannot rely on the pilot signals themselves in order to accurately estimate the traffic channel characteristics and optimize the signals produced in each of the fingers in a RAKE receiver.

To increase the accuracy with which cellular signals are decoded when received from two or more basestations, the present invention combines signals in a RAKE receiver that are weighted based on an estimate of the traffic channel amplitude rather than basing the weights on an analysis of the pilot symbols alone.

Figure 3:
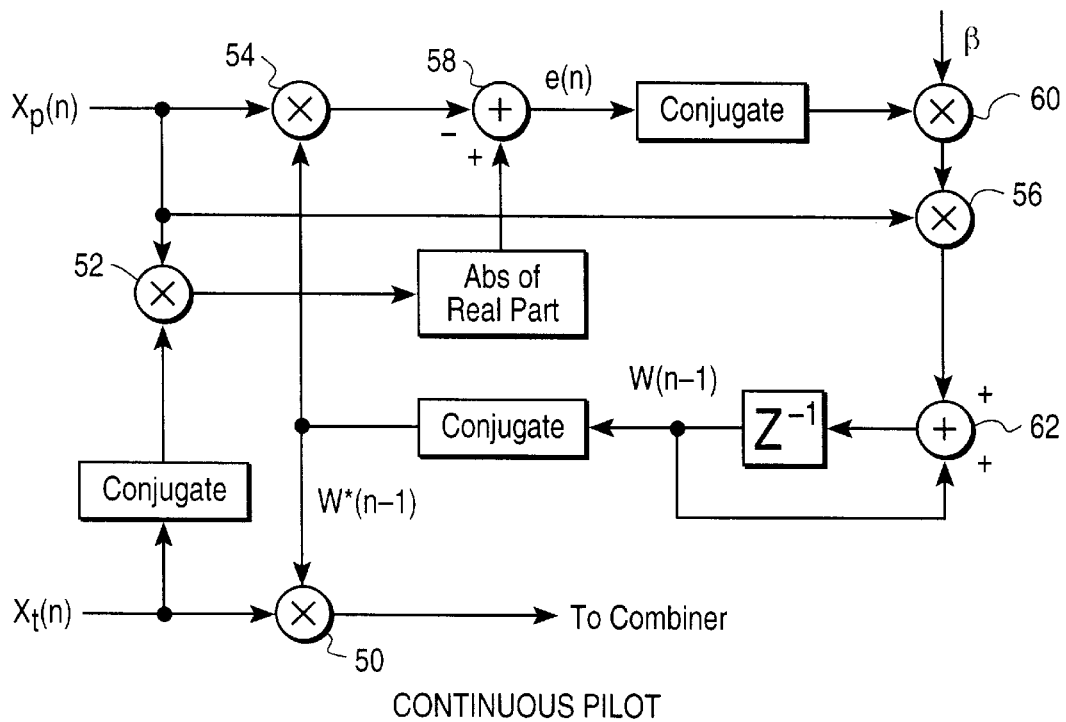
FIG. 3 is a control logic diagram of a method of estimating traffic channel characteristics from a pilot signal in accordance with the present invention.

FIG. 3 is a control diagram illustrating how the present invention analyzes both a received data signal and a pilot signal in order to accurately decode the cellular CDMA signals. The control system represented in FIG. 3 is preferably implemented in a digital signal processor which receives two signals $x_t(n)$, which is the traffic signal, and $x_p(n)$ which is the pilot signal that are received from a single basestation and separated from interfering signals and the signals from other basestations through correlation. Both signals $x_t$ and $x_p$ are complex baseband signals having in-phase and quadrature baseband components. The signal $x_t$ is applied to a multiplier 50. In addition, the conjugate of the signal $x_t$ is applied to a second multiplier 52. Applied to another input of the multiplier 52 is the pilot signal $x_p$ such that the output of the multiplier effectively removes a phase component of the traffic signal. In addition, the pilot signal $x_p$, is applied to inputs of a third multiplier 54 and a fourth multiplier 56.

The absolute value of the real part of the output of the multiplier 52 is computed to effectively remove the data modulation component of the traffic signal. The result is applied to a positive input of a summer 58. Applied to a negative input of the summer 58 is the output of the multiplier 54. The output of the summer 58 is an error signal that represents the difference of the actual pilot and traffic signals and a model of the signals created in the control law. The conjugate of the error signal produced at summer 58 is calculated and applied to an input of a multiplier 60. Applied to another input to the multiplier 60 is a factor β that is selected to optimize the time required for the error signal produced at the output of the summer 58 to reach zero. The factor β is preferably selected by a computer simulation of the control system shown in FIG. 3 and optimized during field trials of the system.

The output of the multiplier 60 is applied to a second input of the multiplier 56. The output of multiplier 56 is provided to an input of a summer 62. The output of the summer 62 is delayed by one sample time. The delayed output is fed back to an input of the summer 62 to be added with the output of the multiplier 56. In addition, the conjugate of the delayed signal is applied to inputs of the multiplier blocks 50 and 54 described above.

The embodiment of the invention shown in FIG. 3 is directly applicable to the IS-95 standard for CDMA cellular systems and is therefore the currently preferred embodiment of the invention. The pilot signal is accurately modeled as $$X_p(n)=A_p(n)*e^{(i\cdot\theta(n))}+\text{interference} \qquad (1)$$

where $A_p(n)$ is the time-variant, fading envelop of the pilot signal and P(n) is the time-variant phase process of the pilot signal. $X_t$ is a complex signal consisting of in-phase and quadrature components but also includes the traffic information, bearing data, d(n). This data signal is therefore modeled by $$X_t(n)=A_t(n)*d(n)*e^{(i\cdot\theta(n))}+\text{interference} \qquad (2)$$

The flat fading channel to be estimated is the complex quantity $A_t(n)\cdot e^{(i\cdot P(n))}$. The channel estimate is given by $$W(n)=W(n-1)+\beta*X_p(n)*e*(n) \qquad (3)$$

where the error signal, e(n), is given by $$e(n)=\text{Abs}(\text{Re}\{X_p(n)*X_t*(n)\})-X_p(n)*W*(n-1) \qquad (4)$$

Upon convergence based on setting β, the product $$X_t(n)*W*(n-1)=A_t^2(n)*d(n) \qquad (5)$$

The right hand side is the required result needed for maximal ratio combining of the traffic channel multipath components.

As can be seen from the above description, the control system illustrated in FIG. 3 converges the weights W(n−1) to a value equal that is an estimate of the traffic channel amplitude. The weights scale the traffic channel signals in the multiplier 50 to be summed with the outputs of the other fingers of the RAKE receiver.

Figure 4:
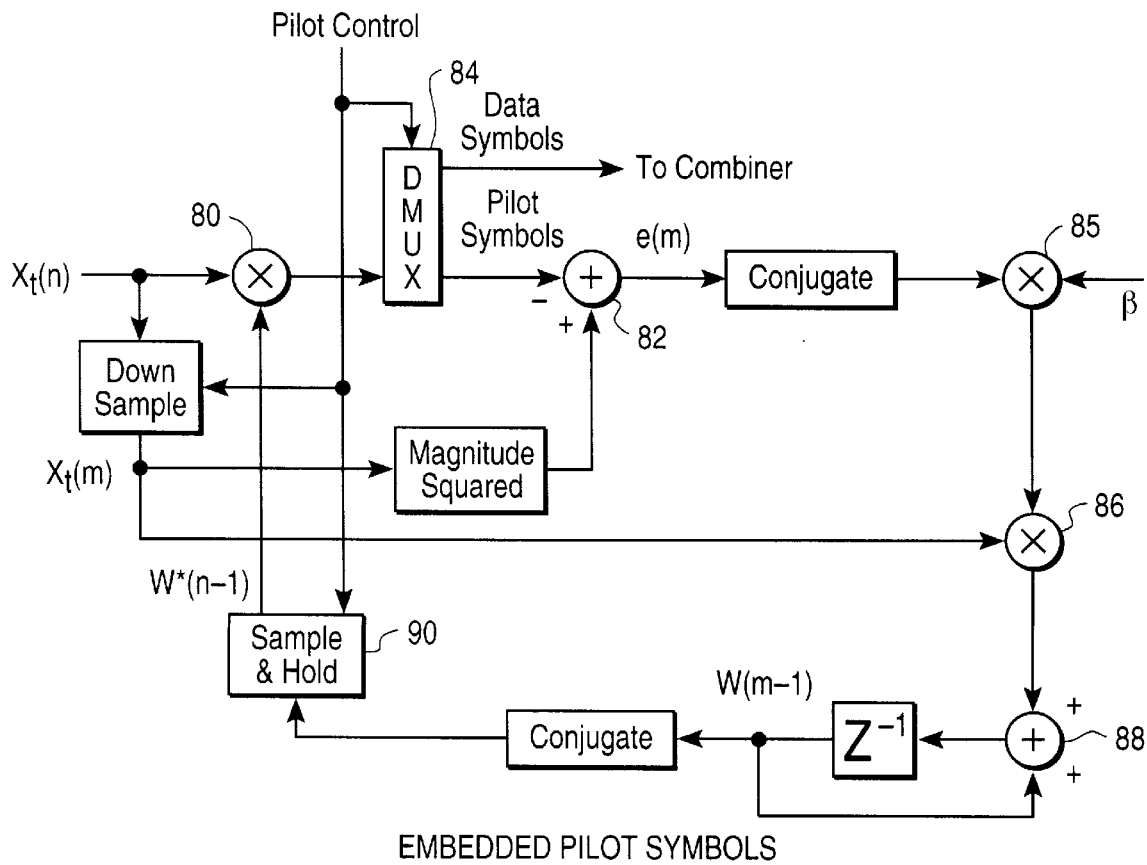
FIG. 4 illustrates a control logic diagram of a system for estimating traffic channel characteristics when pilot symbols are interleaved with the traffic channel signals according to another aspect of the present invention.

Future generations of CDMA standards may use pilot symbols which are interleaved with data signals on the traffic channel. To utilize the present invention with these embedded pilot signals, the control system shown in FIG. 4 is used. In this embodiment, a combination signal $x_t(n)$ represents the traffic channel having the embedded pilot symbols. The signal $x_t$ is applied to a first input of a multiplier 80. The output of the multiplier is an input to a demultiplexer 84. When the data signals are present, the data signals are weighted with an estimate of the traffic channel amplitude and the demultiplexer routes the weighted data to be combined with other data signal outputs of the RAKE receiver. When the pilot symbol is present, the feedback loop operates to update the weight or estimate of the traffic channel amplitude applied to the data signal as described below.

In addition to being applied to the multiplier 80, the signal $x_t$ is also downsampled, i.e., sampled only periodically to produce a data signal $x_t(m)$. The magnitude of the data signal $x_t(m)$ is squared to remove the data and phase components and is applied to an input of a summer 82. Applied to a negative input of the summer 82 are the pilot symbols supplied by a demultiplexer 84. The demultiplexer 84 is controlled by a pilot control signal so that the interleaved pilot symbols are routed to the feedback loop when they drive in the incoming data stream. The output of the summer 82 represents the difference between an estimate of the traffic channel amplitude (as determined by the periodically sampled signal $x_t(m)$) and the interleaved pilot symbol. The conjugate of the signal produced at the output of the summer 82 is applied to a multiplier 85 wherein it is scaled by the factor β that is selected to control the time at which the difference signal produced at the output of the summer 82 is driven to zero. Again, the factor β is determined from computer modeling of the control system shown in FIG. 4 and fine-tuned during field trials of the CDMA system.

The output of the multiplier 85 is applied to an input of a multiplier 86. Applied to another input of the multiplier 86 is the signal $x_t(m)$. The output of the multiplier 86 is supplied to the input of a summer 88. Applied to another input of the summer 88 is a delayed version of the output of the summer 88. The conjugate of the delayed output of the summer 88 is the weight W(m−1), with which the data signals are scaled and therefore represents an estimate of the traffic channel amplitude. The weight is applied to a sample and hold circuit 90 that maintains the weight for the period when the data signal in the traffic channel is being received. The output of the sample and hold circuit is applied to an input of the multiplier 80 that scales the incoming data within the input signal $x_t(n)$ with the weight prior to application to the demultiplexer 84.

When the pilot symbol is being transmitted, the pilot control causes the demultiplexer 82 to route the pilot symbol to the input of the summer 82 to update the weight W(m−1) as described above. When the weight, W(m−1) is multiplied with the input signal $x_t$, the data is extracted in a manner that is more accurate than if the pilot signal alone were used to estimate the distortion of the traffic channel.

With the approach shown in FIG. 4, the pilot control signal is used to demultiplex the pilot symbols from the data symbols. Channel corrected data symbols are forwarded to the subsequent processing associated with data detection while the pilot symbols are processed by the feedback loop described above. Since the feedback loop is operating at a decimated rate, the sample and hold circuit 90 holds the channel estimate during periods when the data symbols are being processed. The basic loop equation of (3) still holds but must account for the decimated update rate. Denote the time index of this decimated rate as 'm' then the loop update equation becomes $$W(m)=W(m-1)+\beta^* X_t(m)^* e^*(m) \qquad (6)$$

The error signal for this case is given by $$e(m)=\text{Abs}(X_t^2(m))-X_t(m)^* W^*(m-1) \qquad (7)$$

As can be seen from the above, the present invention improves the ability of a RAKE receiver to detect CDMA signals when received from two or more basestations by weighting a received data signal as a function of the traffic channel amplitude rather than on the pilot symbols alone.

In the claims:

1. A method of combining CDMA cellular signals in a RAKE receiver having one or more channels, comprising:
   receiving a CDMA cellular signal and a pilot signal from two or more basestations;
   separating the CDMA cellular signal and a pilot signal from a single basestation;
   producing an estimate of a traffic channel amplitude;
   weighting the CDMA cellular signal with the estimate and combining the weighted signal with other weighted CDMA cellular signals produced in other channels of the RAKE receiver; and
   updating the estimate of the traffic channel amplitude based on a comparison of the traffic channel amplitude estimate and the pilot signal from the single basestation.

2. A method of combining signals from two or more channels in a RAKE receiver, comprising:
   supplying a data signal received on a traffic channel and a pilot signal received on a pilot channel to each channel in the RAKE receiver;
   comparing the product of the data signal and the pilot signal with the product of the pilot signal and an estimate of a traffic channel amplitude;
   updating the estimate of the traffic channel amplitude;
   scaling the data signal received on the traffic channel with the estimate of the traffic channel amplitude; and
   combining the scaled data signals from each channel in the RAKE receiver.

3. A method of detecting CDMA cellular signals, comprising:
   receiving CDMA cellular signals on a traffic channel, wherein the CDMA cellular signals are received by a rake receiver having a number of channels;
   estimating a traffic channel amplitude by:
      obtaining a previous estimate of the traffic channel amplitude and adding to it an amount that is proportional to the product of the pilot signal and an error signal;
      the error signal being proportional to a difference between the product of the previous estimate of the traffic channel amplitude and the pilot signal and the product of the pilot signal and the CDMA cellular signals;
      wherein the estimate of the traffic channel amplitude is made such that the error signal is minimized, and
   weighting the CDMA signals with the estimate of the traffic channel amplitude.

4. The method of claim 3, wherein the pilot signal is defined as:

$$X_p(n)=A_p(n)\cdot e^{(i\cdot\theta(n))}+\text{interference}$$

where Ap is the pilot signal channel amplitude, Π(n) is the time variant phase process of the pilot signal and the estimate of traffic channel amplitude W(n) is determined according to the equation:

$$W(n)=W(n-1)+\beta\cdot X_p(n)\cdot e^*(n)$$

where the error signal e(n) is given by the equation:

$$e(n)=\text{Abs}(\text{Re}\{X_p(n)\cdot X_t^*(n)\})=X_p(n)\cdot W^*(n-1)$$

and $X_t$ is the CDMA cellular signals received on the traffic channel and β is a constant that determines a rate at which the error signal is minimized.

5. A cellular telephone for receiving CDMA cellular signals, comprising:
   a rake receiver having a number of channels that receive the CDMA cellular signals on a traffic channel and a pilot signal on a pilot channel; and
   a digital signal processor that produces an estimate of the traffic channel amplitude by obtaining a previous estimate of the traffic channel amplitude and adding it to an amount that is proportion to the product of the pilot signal and an error signal, wherein the error signal is proportional to a difference between the product of the previous estimate of the traffic channel amplitude and the pilot signal and the product of the pilot signal and the CDMA cellular signals, wherein the estimate of the traffic channel amplitude is made such that the error signal is minimized, the digital signal processor weighting the CDMA signals in the number of channels of the rake receiver with the estimate of the traffic channel amplitude, wherein the weighted CDMA cellular signals in the number of channels of the rake receiver are combined to produce an estimate of the CDMA cellular signals.

6. The cellular telephone of claim 5, wherein the pilot signal is represented according to the equation:

$$X_p(n) = A_p(n) \cdot e^{(i \cdot \Theta(n))} + \text{interference}$$

where Ap is the pilot signal channel amplitude and $\Pi(n)$ is the time variant phase process of the pilot signal; and wherein the digital signal processor produces an estimate of the traffic channel amplitude W(n) according to the equation:

$$W(n) = W(n-1) + \beta \cdot X_p(n) \cdot e^*(n)$$

where the error term e(n) is given by:

$$e(n) = \text{Abs}(\text{Re}\{X_p(n) \cdot X_t^*(n)\}) = X_p(n) \cdot W^*(n-1)$$

and $X_t$ is the CDMA cellular signals received on the traffic channel and $\beta$ is a constant that determines a rate at which the error signal is minimized.

* * * * *